(12) United States Patent
Ahmed

(10) Patent No.: US 8,073,079 B1
(45) Date of Patent: Dec. 6, 2011

(54) ANGLE-MODULATED SIGNAL THRESHOLD EXTENSION DEVICE AND METHOD

(75) Inventor: Ahsen Ahmed, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 638 days.

(21) Appl. No.: 12/254,483

(22) Filed: Oct. 20, 2008

(51) Int. Cl.
*H04L 27/00* (2006.01)

(52) U.S. Cl. ........ 375/324; 375/322; 375/316; 375/346; 455/42; 455/205; 455/501; 455/63.1; 455/67.13; 455/296; 329/318; 329/320

(58) Field of Classification Search .................. 375/324, 375/322, 316, 346; 455/42, 205, 501, 63.1, 455/67.13, 296; 329/318, 320
See application file for complete search history.

(56) References Cited

U.S. PATENT DOCUMENTS

2006/0274641 A1    12/2006    Grieco et al.

OTHER PUBLICATIONS

Ahmed, Ahsen U.; Thompson, Steve C.; Zeidler, James R.; "Threshold Extending Receiver Structures for CE-OFDM;" Military Communications Conference, 2007. MILCOM 2007. (Oct. 29, 2007).

M. Polacek, S. Shamai, and I. Bar-David, "On FM Threshold Extension by Click Noise Elimination," IEEE Trans. on Comm., vol. 36, No. 3, Mar. 1988.

*Primary Examiner* — Chieh M. Fan
*Assistant Examiner* — Leila Malek
(74) *Attorney, Agent, or Firm* — Kyle Eppele; J. Eric Anderson

(57) ABSTRACT

A threshold noise-canceling method comprising the steps of: receiving an angle-modulated signal; identifying in the angle-modulated signal potential threshold noise events that exceed a first threshold value; calculating average values of the phase of the angle-modulated signal before and after a potential threshold noise event; identifying every potential threshold noise event as a threshold noise event when the difference between the corresponding before and after average values of the phase is greater than a second threshold value; and canceling out each threshold noise event by adding to the phase of the angle-modulated signal a $2\pi$ phase shift of polarity opposite to that of the corresponding threshold noise event.

18 Claims, 18 Drawing Sheets

ANGLE-MODULATED SIGNAL THRESHOLD EXTENSION DEVICE AND METHOD

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 99378.

BACKGROUND OF THE INVENTION

This invention relates in general to devices and methods for eliminating threshold noise in angle-modulated signals.

SUMMARY OF THE INVENTION

One embodiment of the Angle-Modulated Signal Threshold Extension Device and Method includes a threshold noise-canceling method comprising the steps of: a) receiving an angle-modulated signal; b) identifying in the angle-modulated signal potential threshold noise events that exceed a first threshold value; c) calculating average values of the phase of the angle-modulated signal before and after a potential threshold noise event; d) identifying every potential threshold noise event as a threshold noise event when the difference between the corresponding before and after average values of the phase is greater than a second threshold value; and e) canceling out each threshold noise event by adding to the phase of the angle-modulated signal a $2\pi$ phase shift of polarity opposite to that of the corresponding threshold noise event.

Another embodiment of the Angle-Modulated Signal Threshold Extension Device and Method includes a constant envelope orthogonal frequency division multiplexing (CE-OFDM) receiver comprising: a phase demodulator configured to demodulate the phase of a CE-OFDM signal; a cycle-slip eliminator comprising: a differentiator configured to differentiate the demodulated phase to produce a differentiated phase signal, a comparator configured to identify potential cycle slips in the differentiated phase signal that exceed a first threshold value, a processor configured to calculate average phase values of the phase signal before and after each potential cycle slip, wherein the processor is further configured to identify every potential cycle slip as a cycle slip when the difference between the before and after average phase values is greater than a second threshold value, and a phase shifter configured to add to the phase signal a $2\pi$ phase shift of polarity opposite to that of the corresponding cycle slip thereby producing a noise-reduced OFDM signal; and an OFDM demodulator configured to demodulate the noise-reduced OFDM signal.

BRIEF DESCRIPTION OF THE DRAWINGS

Throughout the several views, like elements are referenced using like references.

DETAILED DESCRIPTION OF EMBODIMENTS

Figure 1:
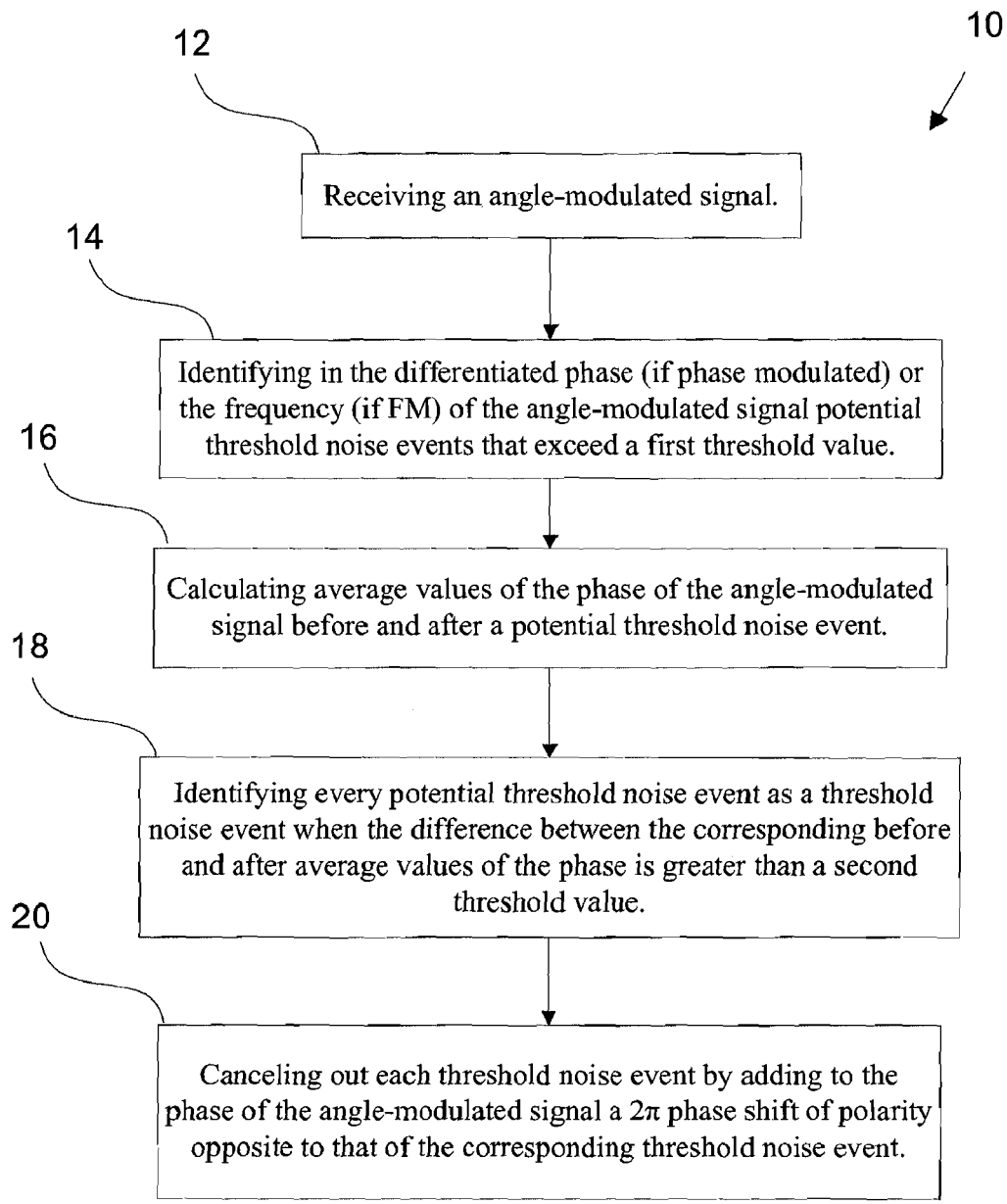
FIG. 1 is a flowchart for a threshold noise-canceling method.

Acronyms used in the Specification:
CCR—Cross Correlator Receiver
CE-OFDM—Constant Envelope Orthogonal Frequency Division Multiplexing
CNR—Carrier to Noise Ratio
DSP—Digital Signal Processing
FIR—Finite Impulse Response
FM—Frequency Modulation
FMFB—Frequency Demodulator using Feedback
FPGA—Field Programmable Gate Array
LD—Limiter Discriminator
OFDM—Orthogonal Frequency Division Multiplexing
PAPR—Peak-to-Average Power Ratio
PLL—Phase Locked Loop
SNR—Signal to Noise Ratio The Angle-Modulated Signal Threshold Extension Device and Method described herein comprises a threshold noise-canceling method 10, as shown in FIG. 1, for extending the threshold of angle-modulated signals. The first step, depicted as step 12 in FIG. 1, of method 10 is receiving an angle-modulated signal. Examples of angle-modulated signals include frequency modulated (FM) and phase modulated signals. After receiving the angle-modulated signal, step 14 comprises identifying potential threshold noise events that exceed a first threshold value. In FM and phase modulated signals, threshold noise events are clicks and cycle slips respectively. The next step, step 16, provides for calculating average values of the phase of the angle-modulated signal before and after a potential threshold noise event. The average values may be computed over 25 samples or less if there is another potential cycle slip within 25 samples. Step 18 provides for identifying every potential threshold noise event as a threshold noise event when the difference between the corresponding before and after average values of the phase is greater than a second threshold value. Step 20 provides for canceling out each threshold noise event by adding to the phase of the angle-modulated signal a 2π phase shift of polarity opposite to that of the corresponding threshold noise event.

Figure 2:
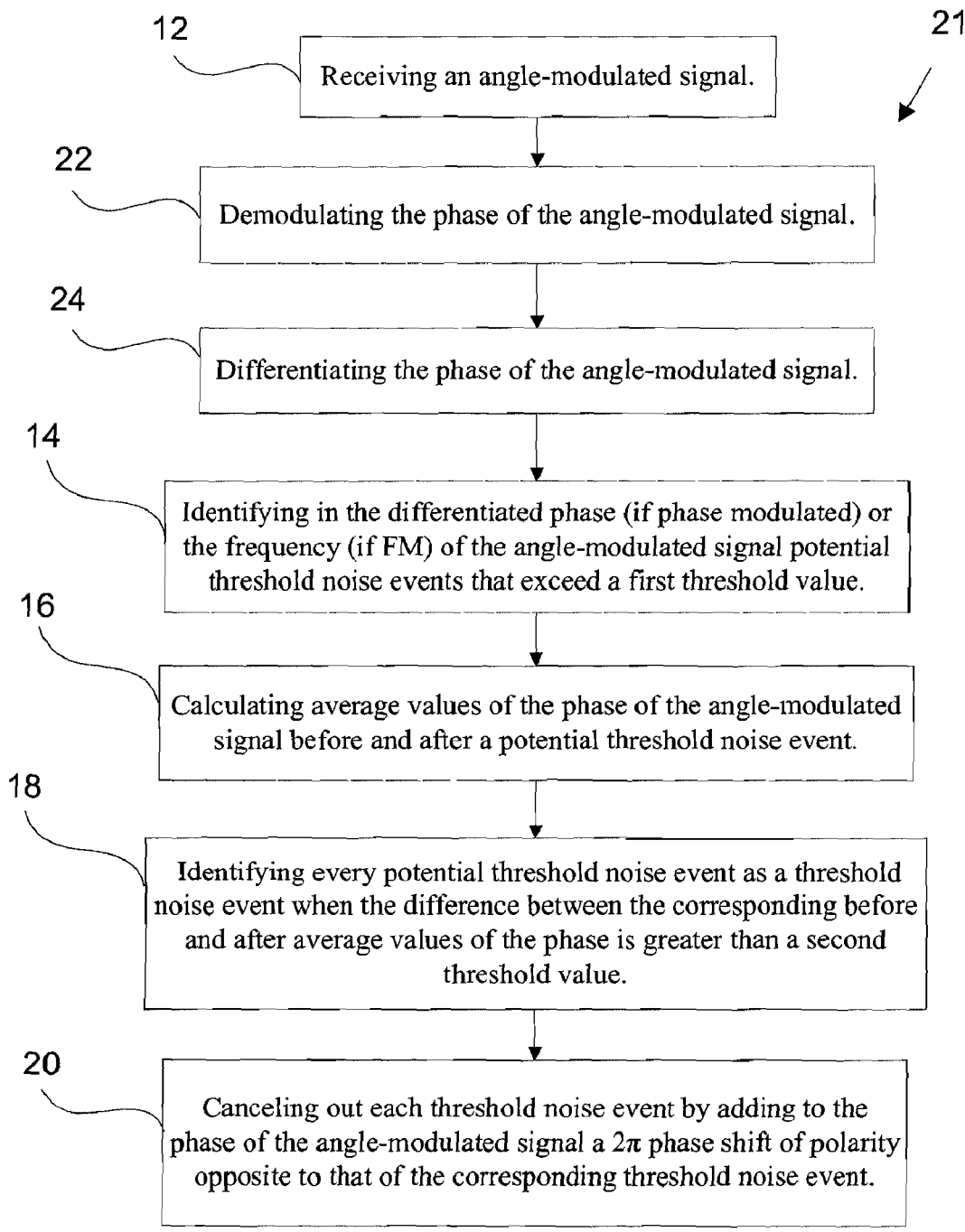
FIG. 2 is a flowchart for a phase-modulated embodiment of the threshold noise-canceling method.

FIG. 2 shows a flowchart of an embodiment 21 of method 10 where the angle modulated signal is a phase modulated signal. FIG. 2 shows additional steps that may be added to method 10. Step 22 provides for demodulating the phase of the angle-modulated signal between steps 12 and 14. Step 24 provides for differentiating the phase of the angle-modulated signal between steps 12 and 14. One example of a phase modulated signal is a constant envelope orthogonal frequency division multiplexing (CE-OFDM) signal.

Figure 3:
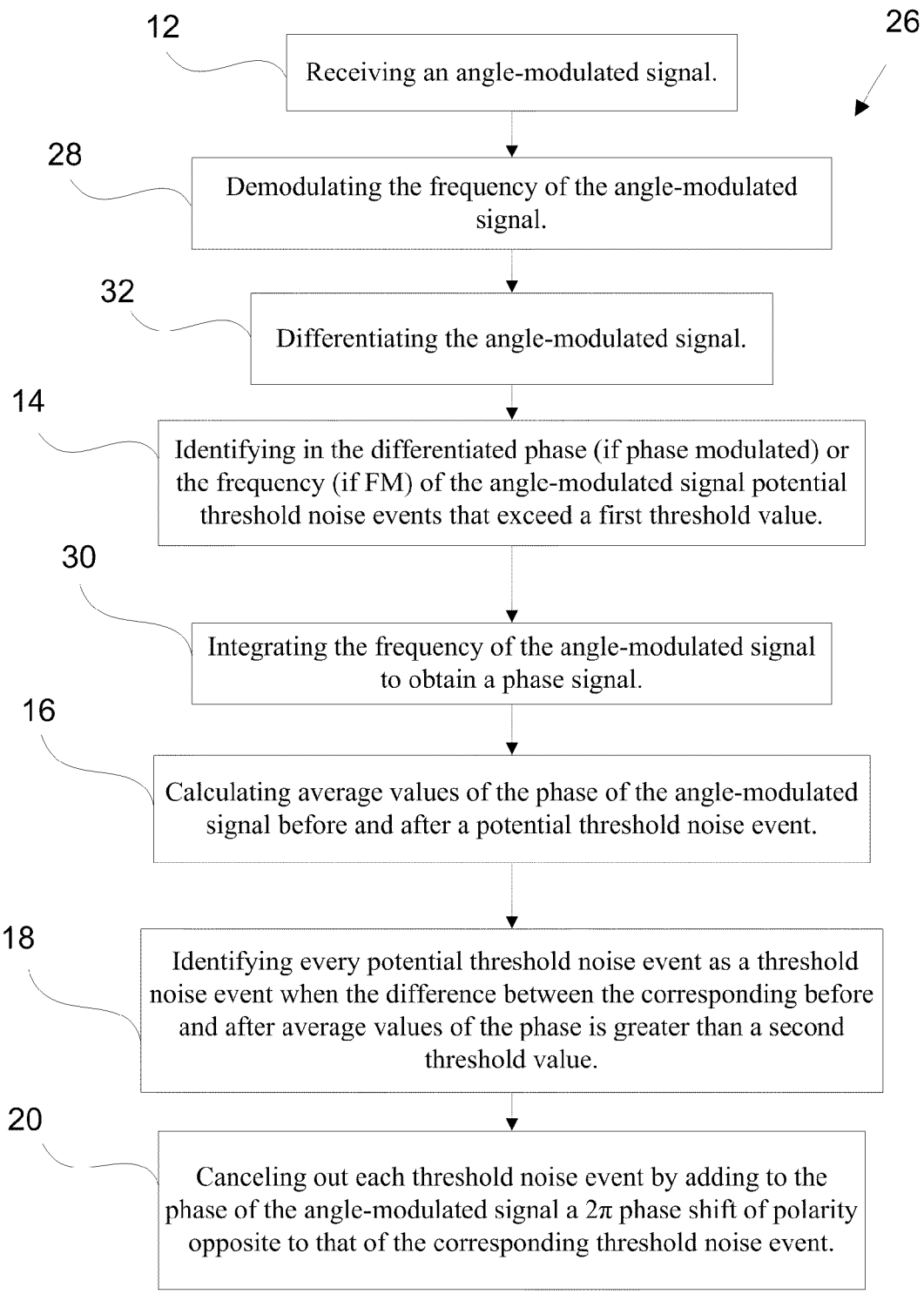
FIG. 3 is a flowchart for a frequency-modulated embodiment of the threshold noise-canceling method.

FIG. 3 shows an alternative embodiment 26 of method 10 where the angle modulated signal is a FM signal. In this embodiment, additional steps are added to method 10. Step 28 provides for demodulating the frequency of the angle-modulated signal before step 12. Step 30 provides for integrating the angle-modulated signal between steps 12 and 14. Step 32 provides for differentiating the angle-modulated signal after step 28.

CE-OFDM transforms a high peak-to-average power ratio (PAPR) OFDM signal to a constant envelope signal using phase modulation. CE-OFDM permits the use of more efficient and non-linear amplifiers which are not compatible with OFDM. A practical CE-OFDM receiver may be based on a phase demodulator, to extract the OFDM signal from the phase, followed by a conventional OFDM receiver. Since CE-OFDM is based on angle modulation, it suffers from the well known threshold effect whereby the demodulated signal to noise ratio (SNR) falls off much more rapidly than the input carrier to noise ratio (CNR). The threshold effect is encountered at low CNR and is accompanied by the appearance of phase cycle slips (click noise in FM). Examples of receiver structures that may be used for CE-OFDM include, but are not limited to, arctangent based receivers with and without a phase unwrapper along with a cycle slip eliminator to detect and compensate for phase cycle slips, FM based receivers such as a limiter discriminator (LD) type receiver, and a digital phase locked loop (PLL).

Figure 4:
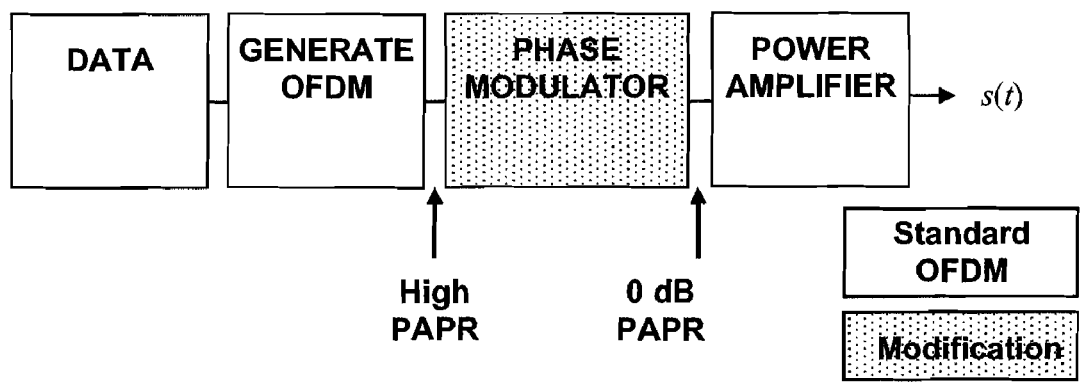
FIG. 4 shows modification of an OFDM system to obtain CE-OFDM.

A CE-OFDM signal may be obtained through a simple transformation of OFDM. The OFDM signal is phase modulated onto a carrier signal to obtain a constant envelope signal with 0 dB PAPR. This is implemented through a straightforward modification of a standard OFDM system as shown in FIG. 4. The baseband CE-OFDM signal is given as $$s(t) = A e^{j\phi(t)}, \quad (1)$$

where A is the signal amplitude. The phase signal $\phi(t)$ with the embedded OFDM signal is given as $$\phi(t) = 2\pi h C_N \sum_{k=1}^{N} d_{ik} q_k(t - i T_s) + \theta_i, \quad i T_s \le t \le (i+1) T_s. \quad (2)$$

The real data symbols $d_{ik} \in \pm 1$ modulate the orthogonal OFDM subcarriers $q_k(t)$ defined below. $T_s$ is the CE-OFDM symbol (block) period. The normalizing constant $C_N = \sqrt{2/\sigma_I^2 N}$ ensures that the phase variance is independent of the number of OFDM subcarriers N and $\sigma_I^2$ is the data variance with $\sigma_I^2 = 1$ for binary data. The modulation index h is the key parameter that controls the performance (signal space properties) and the spectral properties of CE-OFDM. It determines the tradeoff between power and bandwidth. In this application, the scaled modulation index (2πh) is also simply referred to as the modulation index. The phase memory $\theta_i$ may be used to ensure phase continuity across the CE-OFDM symbol boundaries for improved spectral containment. Without loss of generality, full sine and cosine subcarriers (discreet Fourier Transform) separated by $1/T_s$, $q_k(t) = \{\cos(2\pi k t/T_s), \sin(2\pi k t/T_s)\}$ for k=1 to N/2, are used to fulfill the subcarrier orthogonality requirement. The subcarrier energy $E_q$ for these subcarriers is $$E_q = \int_0^{T_s} q_k^2(t) \, dt = T_s / 2.$$

Figure 5:
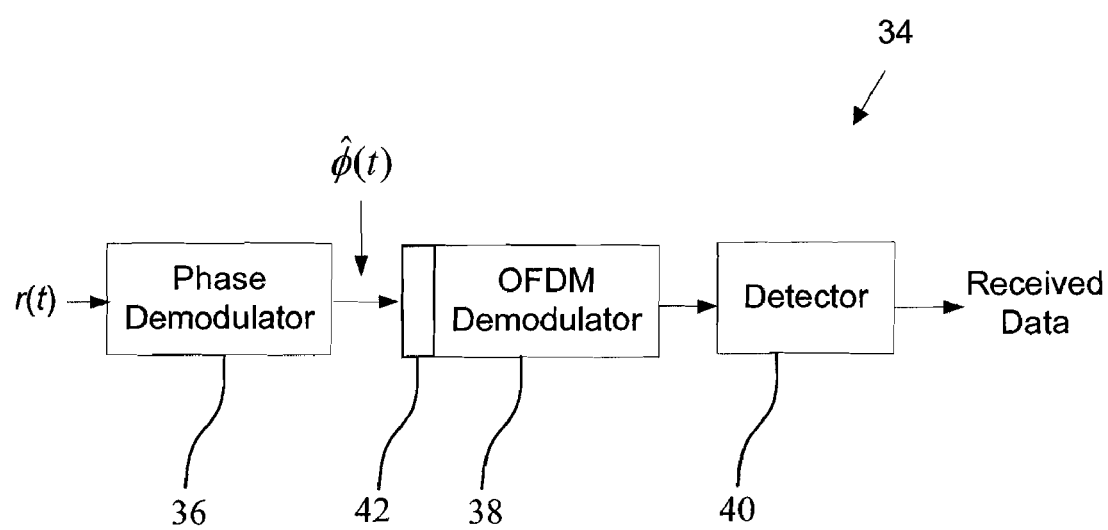
FIG. 5 shows a general receiver structure for CE-OFDM.

FIG. 5 shows a general receiver structure 34 for CE-OFDM consists of a phase demodulator 36, to undo the transformation (phase modulation), followed by a standard OFDM demodulator 38. The OFDM demodulator 38 is followed by a detector 40. The baseband received CE-OFDM signal may be given as $$r(t) = A e^{j\phi(t)} + n(t), \quad (3)$$

where $n(t) \equiv n_c(t) + j n_s(t)$ is the baseband Gaussian noise with power spectral density $$\Phi_n(f) = \begin{cases} N_0, & |f| \le B_{bp}/2 \\ 0, & |f| \ge B_{bp}/2 \end{cases}, \quad (4)$$

where $B_{bp}$ is the system front-end bandwidth which is taken to equal the Nyquist sampling rate ($F_s = 1/T_0$) resulting in independent Gaussian noise samples.

Figure 6:
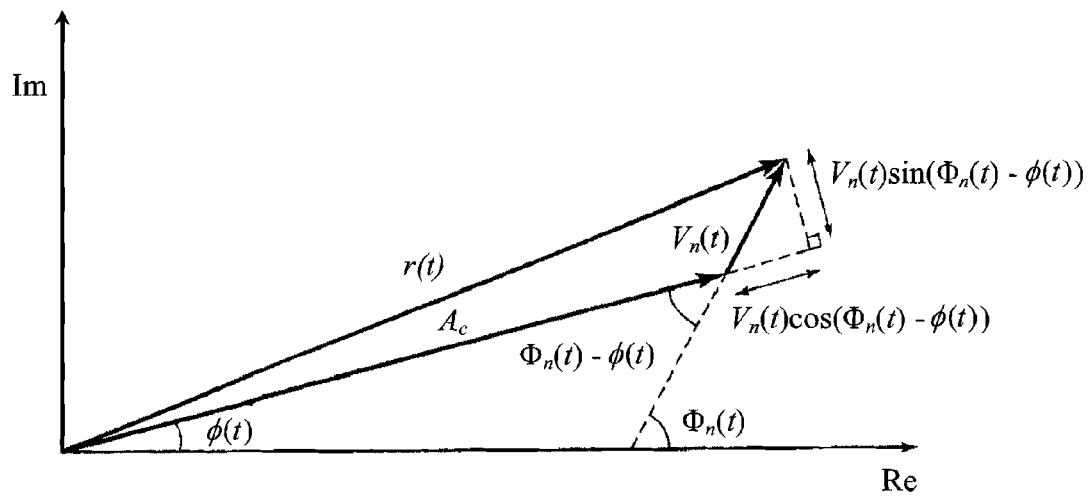
FIG. 6 is a phasor diagram of the phase of an angle-modulated signal with noise.

The noise that enters the phase demodulator 36 is the primary cause of cycle slips (click noise in FM). The use of an optional predetection filter 42 at the input of the phase demodulator 36 can reduce the rate of cycle slips. A narrow bandwidth predetection filter 42 that rejects the out of band noise while resulting in negligible signal distortion can improve the threshold performance. The threshold effect is inherent in angle modulation and therefore also affects CE-OFDM. In the threshold region, at low carrier to noise ratios (CNR), the demodulated SNR falls off much more rapidly for a decrease in CNR. One property of angle-modulated waveforms is the possible tradeoff between bandwidth and power with an increase in the modulation index. However, this tradeoff is limited by the threshold which appears at even higher CNRs for larger modulation indices. Threshold extension provides an increase in the range of CNR over which this tradeoff is possible. The threshold effect is accompanied by a change in the characteristics of the noise at the output of the phase demodulator. The noise n(t) at the input of the receiver from (3) can be represented in polar form as $$n(t) = \sqrt{n_c^2(t) + n_s^2(t)} \, e^{j\left(\arctan\left(\frac{n_s(t)}{n_c(t)}\right)\right)} = V_n(t) e^{j \phi_n(t)}, \quad (5)$$

where $V_n(t)$ and $\phi_n(t)$ are the envelope and phase of the noise process respectively. A phasor diagram of the signal from equation (3) and noise from equation 5 is shown in FIG. 6. As shown in FIG. 6, the received phase may be given as $$\phi_r(t) = \phi(t) + \arctan\left(\frac{V_n(t)\sin(\phi_n(t) - \phi(t))}{A + V_n(t)\cos(\phi_n(t) - \phi(t))}\right). \quad (6)$$

Using this and assuming high CNR, the output of the phase demodulator can be approximated as $$\phi_r(t) \approx \phi(t) + \frac{V_n(t)}{A}\sin(\phi_n(t) - \phi(t)) = \phi(t) + Z_n(t). \quad (7)$$

$Z_n(t)$ provides a good approximation for the noise component at high CNR. Additionally, it can be well approximated as Gaussian distributed for high CNR. While this approximation holds up well for high CNR, the exact distribution for the noise may be computed as $$p(\phi_r | \phi) = \frac{1}{2\pi}e^{-\frac{A^2}{2\sigma^2}}\left[1 + \frac{\sqrt{2\pi}A}{\sigma}\cos(\phi_r - \phi)e^{\frac{A^2\cos^2(\phi_r-\phi)}{2\sigma^2}}\right. \quad (8)$$

$$\left.\Phi\left(\frac{A\cos(\phi_r - \phi)}{\sigma}\right)\right]$$

$$= \frac{1}{2\pi}e^{-CNR}\left[1 + \sqrt{4\pi CNR}\cos(\phi_r - \phi)e^{CNR\cos^2(\phi_r-\phi)}\right.$$

$$\left.\Phi(\sqrt{2CNR}\cos(\phi_r - \phi))\right],$$

where $\sigma^2$ is the variance of bandpass noise at the receiver input and $$\Phi(x) = \frac{1}{\sqrt{2\pi}}\int_{-\infty}^{x} e^{-\frac{y^2}{2}}dy.$$

The carrier to noise ratio (CNR) is given as $$CNR = \frac{\frac{A^2}{2}}{\sigma^2} = \frac{\frac{A^2}{2}}{N_0 B_m}, \quad (9)$$

where $B_m = N/T_s$ is the message signal (OFDM) bandwidth.

The distribution in (8) approaches Gaussian for high CNR agreeing with the Gaussian approximation mentioned above. Furthermore, the power spectral density of the noise component for a phase modulated signal can be approximated as $s_z(f) \approx N_0/A^2$ W/Hz when the modulated signal bandwidth is much larger than the message bandwidth. Therefore, in order to determine the relationship between the CNR and the demodulated SNR at high CNR, the noise at the output of the phase demodulator can be characterized as Gaussian noise with a flat power spectral density of $N_0/A^2$ W/Hz over the message bandwidth. The phase demodulator is followed by a conventional OFDM demodulator as shown in FIG. 2. Considering the ith CE-OFDM symbol without loss of generality, the output of the kth matched filter of the OFDM demodulator may be given as $$Y_k = \int_{(i-1)T_s}^{iT_s} \phi_r(t)q_k(t - iT_s)dt = S_k + N_k, \quad (10)$$

where $$S_k = \int_{(i-1)T_s}^{iT_s} \phi(t)q_k(t - iT_s)dt = 2d_k\pi h C_N E_q \in \pm 2\pi h C_N E_q \quad (11)$$

and $$N_k = \int_{(i-1)T_s}^{iT_s} Z_n(t)q_k(t - iT_s)dt. \quad (12)$$

Since the noise process $Z_n(t)$ is well approximated as Gaussian for high CNR and $\{q_k(t)\}$ are an orthogonal set spanning an N-dimensional space, the $N_k$'s are independent zero mean Gaussian random variables with variance $\sigma_N^2 = N_0 E_q/A^2$. The demodulated SNR is therefore given as $$SNR_{out} = \frac{S_k^2}{\sigma_N^2} = \frac{(2\pi h C_N E_q)^2}{\frac{N_0}{A^2}E_q} = \frac{(2\pi h)^2 A^2}{N_0}\frac{2}{N}\frac{T_s}{2} = 2(2\pi h)^2 CNR. \quad (13)$$

Equation (13) represents the linear relationship between the CNR and the demodulated SNR that holds above threshold. It also signifies the tradeoff whereby the demodulated SNR increases with an increase in the modulation index at the expense of bandwidth. When the CNR drops below threshold, the noise phasor in FIG. 6 is large enough to occasionally encircle the origin resulting in a $2\pi$ phase shift (rotation) in the resultant phase. This new type of noise is known as click noise (in FM) resulting in spikes in the demodulated FM signal or cycle slips in the demodulated phase-modulated signal. Each spike is of area $2\pi$, while each cycle slip results in a $2\pi$ phase shift. The spikes and cycle slips contribute a significant amount of noise power for low CNR resulting in a rapid decline in demodulated SNR as the CNR falls below threshold. Noise may be approximately modeled as having a continuous Gaussian component that is occasionally interrupted by clicks. With this model, the noise is comprised of two components: a continuous Gaussian component added to a sequence of randomly occurring clicks. The rate of clicks, which depends on the CNR, determines the noise power contributed by the click component.

The realization that click noise is primarily responsible for the onset of threshold supports the development of receiver structures that provide threshold extension by some form of reduction in click noise. This is accomplished by either using a feedback loop mechanism such as in PLL and frequency demodulator using feedback (FMFB) based receivers for click noise suppression or by employing click detection and elimination schemes with a conventional receiver such as the limiter discriminator (LD).

In one embodiment, the phase demodulator 36 may be a conventional limiter discriminator (LD) receiver. A LD receiver consists of a limiter followed by a discriminator. Since the message signal in FM is embedded in the frequency, the amplitude variations of the signal are due to noise alone and therefore a limiter is used to suppress the noise induced amplitude variations. The limiter is followed by the discriminator which has a transfer characteristic which increases linearly with frequency. The discriminator is essentially a differentiator that performs differentiation in the time domain, resulting in a signal whose amplitude varies precisely as the instantaneous frequency of the signal. If the received signal is given as $$r(t) = A\cos(\omega_c t + \phi(t)) + n(t) = A_r(t)\cos(\omega_c t + \phi_r(t)), \quad (14)$$

then the output of the limiter discriminator is $$y_{LD}(t) = -A_L \left[ \omega_c + \frac{d}{dt}\phi_r(t) \right] \sin(\omega_c t + \phi_r(t)), \quad (15)$$

where $A_L$ is the limited amplitude from the limiter. For the case of FM, an envelope detector can be used at the output of the discriminator to recover the message signal embedded in the frequency. Adding an integrator at the output of the LD results in a phase demodulator.

Figure 7:
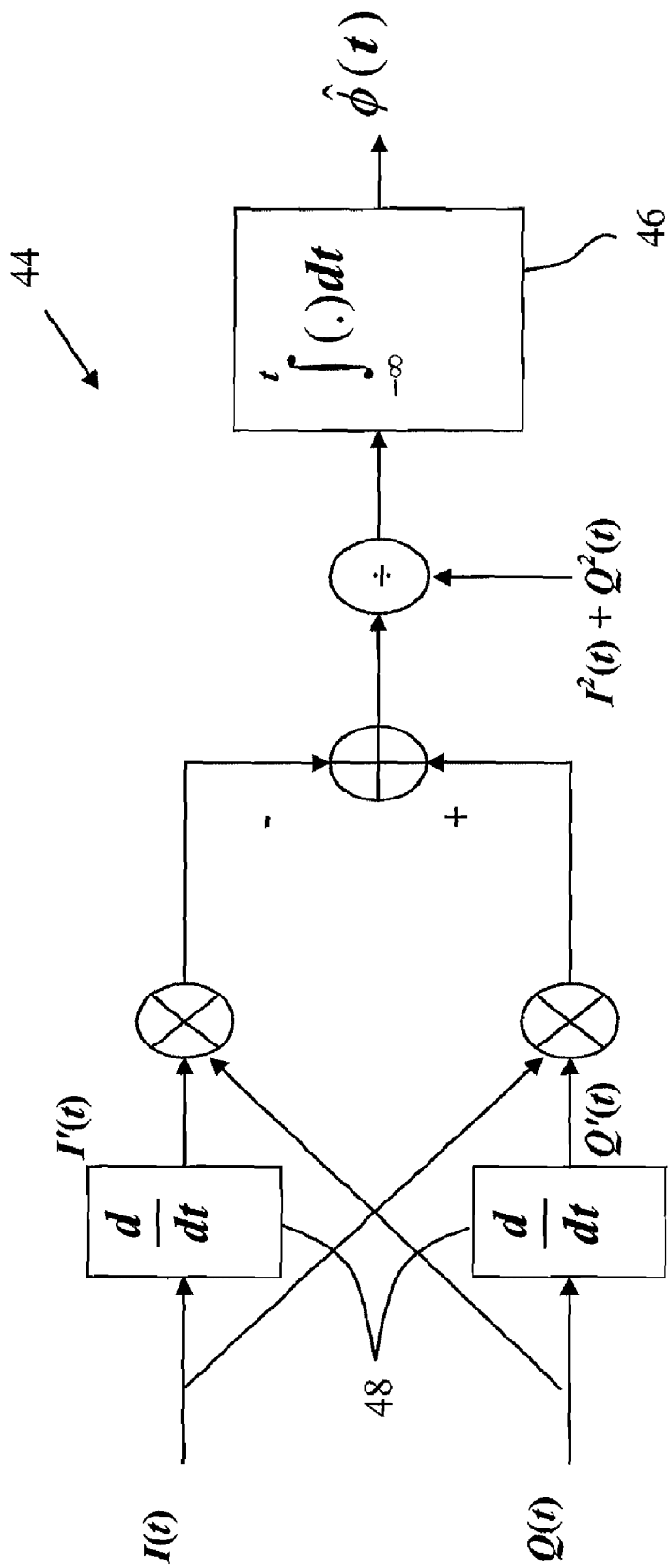
FIG. 7 shows a general receiver structure for CE-OFDM.

FIG. 7 shows another embodiment of the phase demodulator 36 as a cross-correlator receiver (CCR) 44. The CCR 44 is based on the ideal FM detector. The CCR 44 is well suited for a digital implementation in a digital signal process (DSP). The baseband received signal given in equation (3) may be written as $$r(t) = A\cos\phi(t) + n_c(t) + j(A\sin\phi(t) + n_s(t)) = I(t) + jQ(t), \quad (16)$$

where I(t) and Q(t) are the quadrature components. The phase of the received signal is $$\hat{\phi}(t) = \tan^{-1} \frac{Q(t)}{I(t)} \quad (17)$$

and the output of the ideal FM detector is then given as $$\hat{\phi}'(t) = \frac{d}{dt}\hat{\phi}(t) = \frac{d}{dt}\tan^{-1}\frac{Q(t)}{I(t)} \quad (18)$$
$$= \frac{I(t)Q'(t) - Q(t)I'(t)}{I^2(t) + Q^2(t)}.$$

The CCR 44 lends itself well to a digital implementation. Since the output is the instantaneous frequency, adding an integrator 46 results in a phase demodulator as needed for CE-OFDM.

Figure 8:
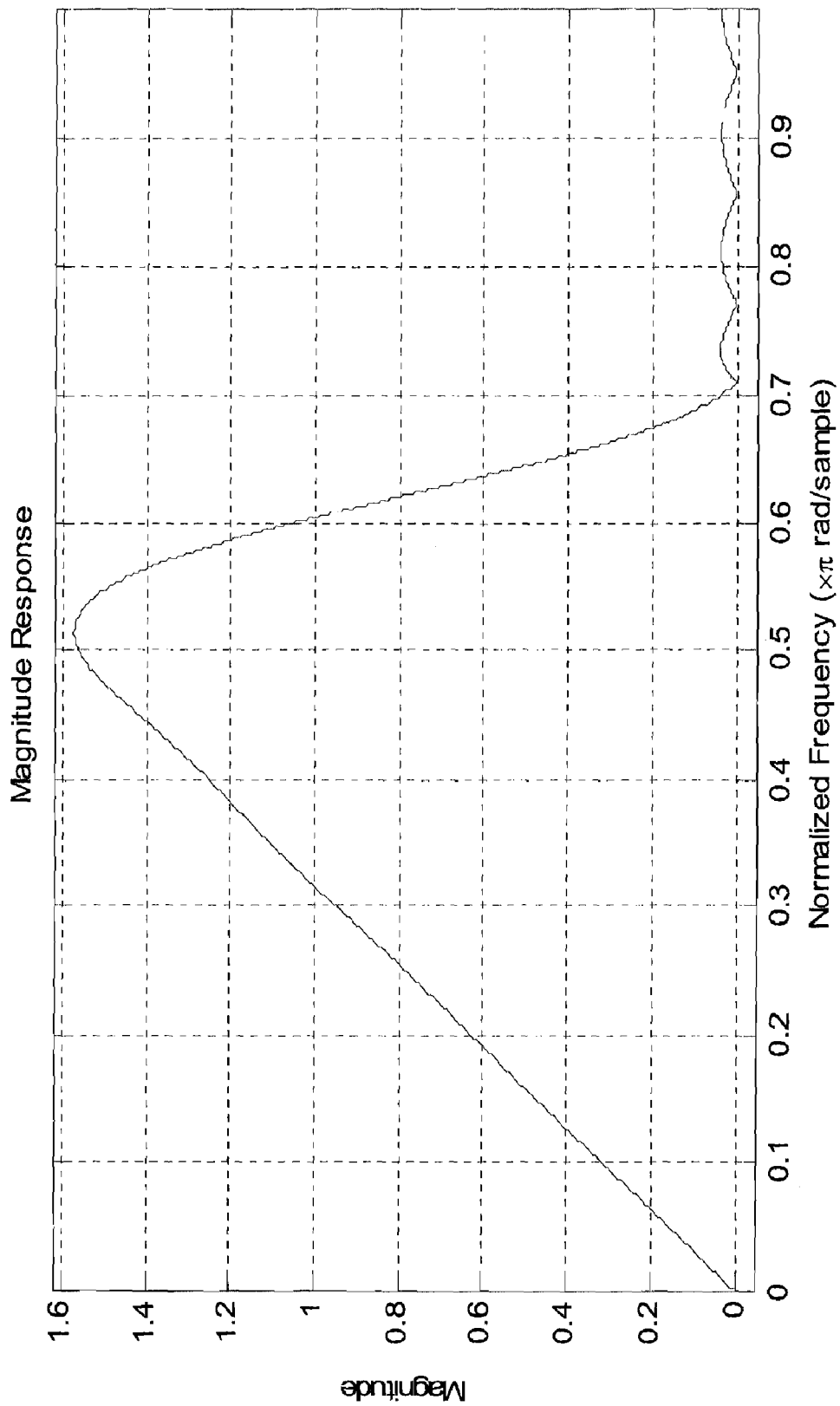
FIG. 8 shows the magnitude response of a FIR differentiator.

The CCR 44 in FIG. 7 can be implemented in discrete time using the sampled baseband quadrature components, I(n) and Q(n). The differentiators 48 can be implemented in a DSP or field programmable gate array (FPGA) environment for varying degrees of fidelity and complexity. The central difference differentiator (I'(n)=(I(n+1)–I(n–1))/2) provides a very simple differentiator which is linear for small frequencies (f<0.08$F_s$) and provides good attenuation at higher frequencies. A higher order differentiator 48 can be designed to attain greater accuracy at the cost of complexity. A finite impulse response (FIR) filter of length 19 with a frequency response that increases linearly up to a normalized frequency of 0.5 and a stop band from 0.7 to 1 may be used in the CCR 44. FIG. 8 shows the magnitude response of a FIR differentiator of length 19 used in the CCR 44 where the frequencies are normalized by $F_s$/2.

Figure 9:
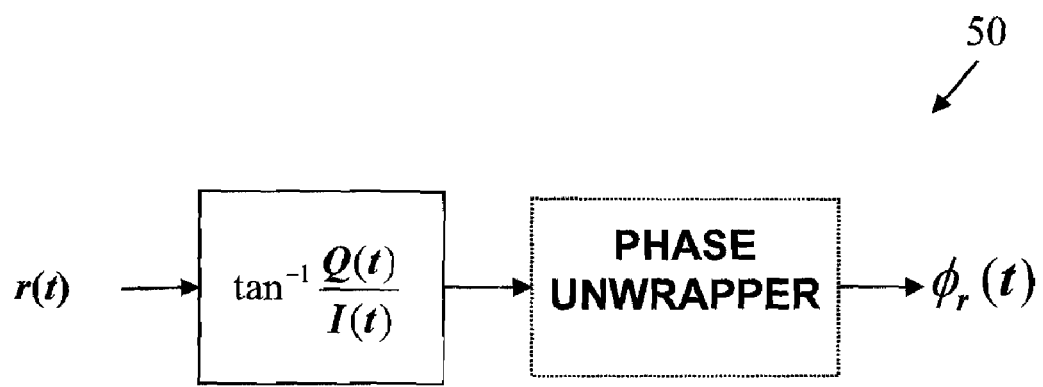
FIG. 9 shows an arctangent based phase demodulator.
Figure 10:
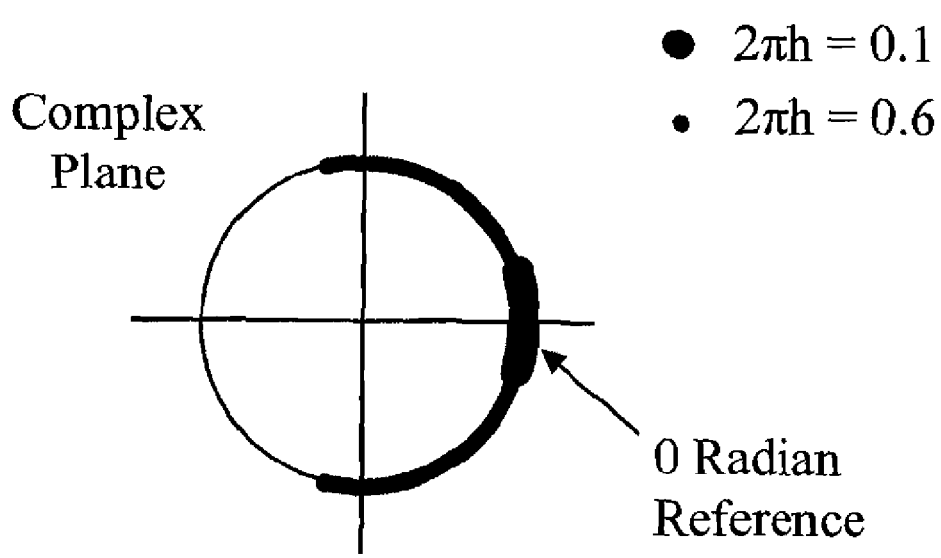
FIG. 10 shows a representation of CE-OFDM phase deviation as a function of modulation index.

FIG. 9 shows the phase demodulator 36 as an arctangent based receiver 50. In the arctangent based receiver 50 embodiment, the phase of the baseband received signal r(t) is extracted by taking the inverse tangent of the quadrature baseband components. The arctangent provides the instantaneous phase which is restricted to the $-\pi$ to $+\pi$ range. This results in phase wrapping when the phase crosses the $-\pi/+\pi$ phase boundary such as for high OFDM signal peaks. Phase wrapping is more frequent for higher modulation indices that traverse a larger section of the unit circle, as shown in FIG. 10, or for the cases when random phase shifts due to the channel push the phase reference from 0 to a point closer to the $-\pi/+\pi$ phase boundary. In such cases, it is necessary to use a phase unwrapper to reconstruct the original unrestricted phase. FIG. 10 shows CE-OFDM phase deviation as a function of modulation index.

A phase unwrapper (e.g. unwrap in MATLAB) operates on a sample by sample basis by searching for phase jumps larger than $\pi$ and replacing them by their $2\pi$ complement. The phase unwrapper is prone to making errors due to the presence of noise and performs especially poorly at low CNR when significant noise is present. The phase unwrapper errors result in $2\pi$ phase jumps in the demodulated phase, analogous to cycle slips described earlier. For small modulation indices where an equalizer corrects any phase shifts due to the channel resulting in a 0 radian phase reference, the phase wrapping is very infrequent.

Figure 11:
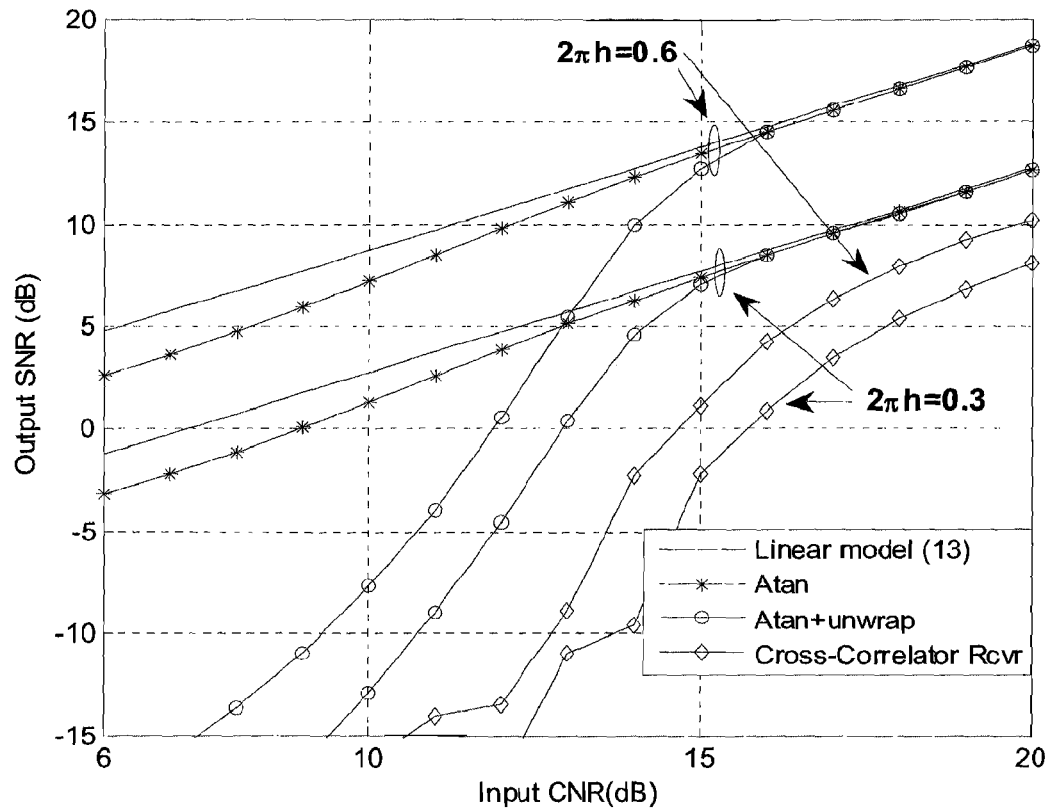
FIG. 11 is a graph of demodulated SNR as a function of CNR with $R_{OS}=4$ for several different types of phase demodulators with no predetection filter.
Figure 12:
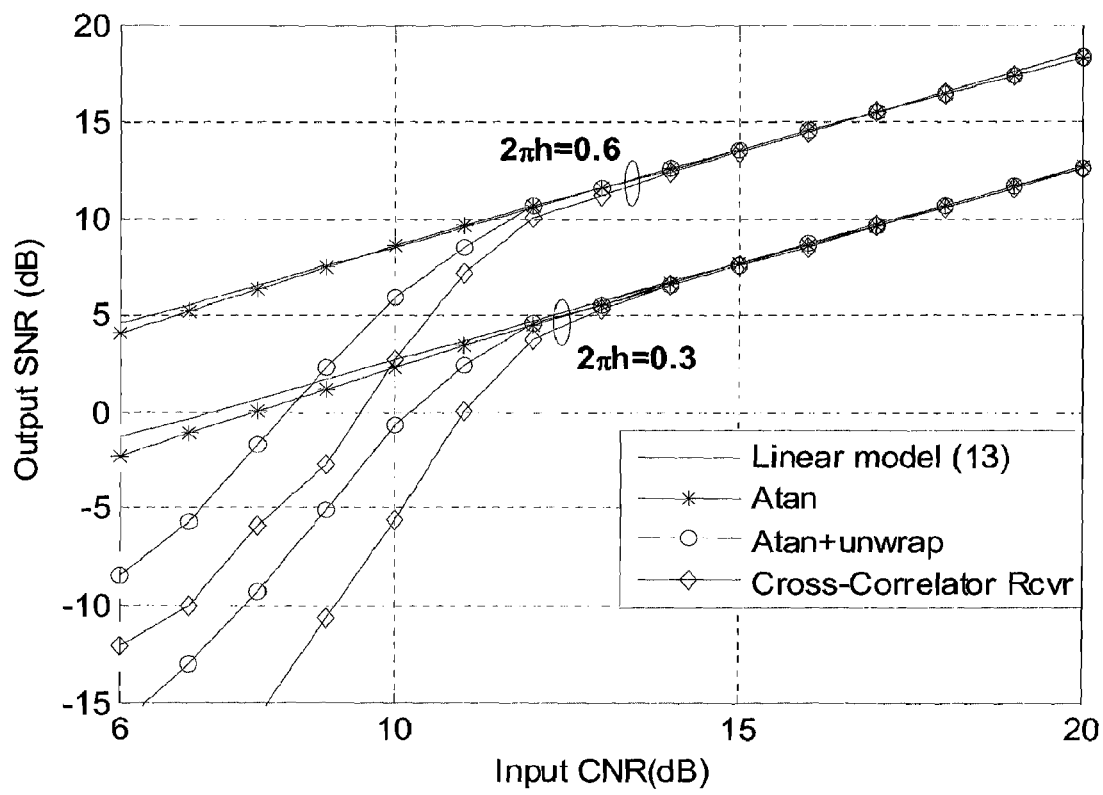
FIG. 12 is a graph of the demodulated SNR as a function of CNR with $R_{OS}=4$ for several different types of phase demodulators coupled with a predetection filter.

The performance of the CCR 44 along with the arctangent based receiver 50 both with and without a phase unwrapper is shown in FIGS. 11 and 12, where $fT_b$=2.4 for $2\pi h$=0.3 and $fT_b$=1.6 for $2\pi h$=0.6. FIG. 11 shows the performance of the CCR 44 for an over sampling factor of $R_{OS}$=4 without a prediction filter 42. FIG. 12 shows the performance of the CCR 44 for an over sampling factor of $R_{OS}$=4 with a prediction filter 42. The arctangent receiver 50 without the phase unwrapper requires an equalizer to undo the random channel phase shift. The linear demodulated SNR computed for high CNR in (13) is also plotted. As expected, the performance is much better with the predetection filter 42 present due to the reduction in noise entering the receiver. Both the CCR 44 and the arctangent receiver 50 with the unwrapper show the onset of threshold as indicated by the deviation of the demodulated SNR from the linear model. However, the arctangent receiver 50 without the unwrapper does not show any signs of the threshold effect. This can be explained from the fact that this receiver only provides a sample by sample estimate of the phase and therefore isn't prone to cycle slips which result in $2\pi$ phase jumps in the demodulated phase. However, the demodulated SNR for it does deviate slightly from the linear model for low CNR which is due to the reduced accuracy at low CNR of the approximations used to obtain the linear model in (13). For modulation indices higher than $2\pi h$=0.6, there is significant amount of phase wrapping and hence the arctangent based receiver 50 without a phase unwrapper has a significant loss over the linear model. The arctangent based receiver 50 with the phase unwrapper shows a lower threshold (of around 11.25 dB) compared to the CCR 44 (around 12 dB). This is mainly because of the amplification of high frequency noise by the differentiators in the CCR 44 which also explains the poor performance of the CCR 44 when a predetection filter 42 is not used.

Figure 13:
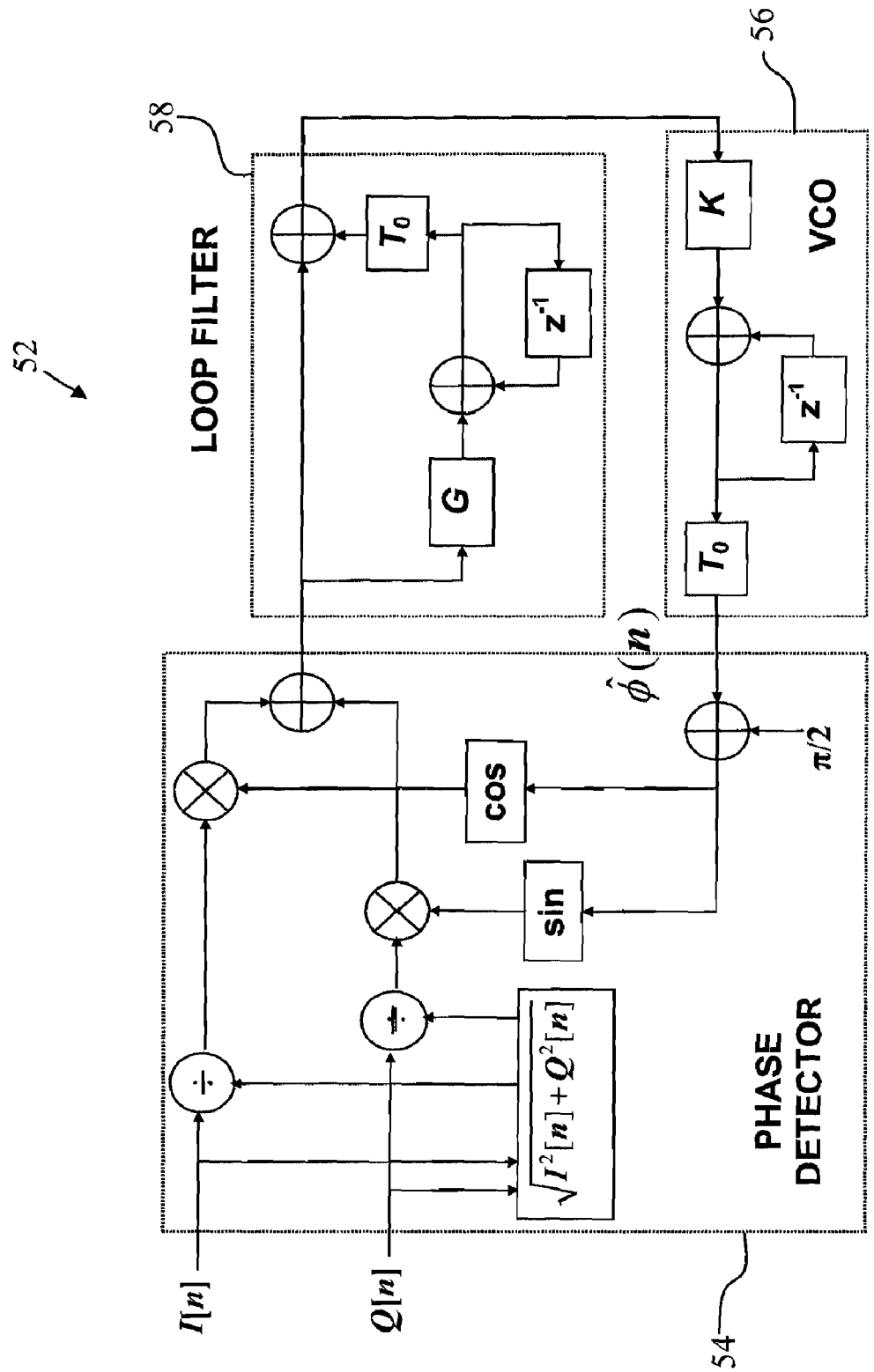
FIG. 13 shows a second-order digital PLL phase demodulator.

FIG. 13 shows an embodiment of the phase demodulator 36 as a second-order digital phase locked loop (PLL) receiver 52. Since the threshold is primarily the result of cycle slips (click noise), the PLL receiver 52 provides threshold extension by suppressing the rate of cycle slips compared to a conventional limiter discriminator receiver. The cycle slips in a PLL receiver 52 are from two sources: (1) Threshold induced cycle slips (TICS) due to noise and (2) Loss of lock cycle slips (LLCS). The threshold induced cycle slips are the result of the PLL receiver 52 tracking an encirclement of the origin by the received signal phase due to noise. The PLL receiver 52 rejects most TICS by not tracking the origin encirclement and instead slipping a cycle. A PLL receiver 52 with infinite bandwidth would track all TICS and result in noise performance identical to a LD receiver. Reducing the bandwidth of the PLL receiver 52 reduces the amount of noise entering the loop and therefore reduces the rate of TICS.

Conversely, cycle slips due to loss of lock are a result of the PLL receiver 52 not being able to track the received signal phase. Therefore, the rate of LLCS is reduced by increasing the loop bandwidth. The overall goal for threshold reduction in a PLL receiver 52 is to reduce the total number of cycle slips to a minimum (less than a LD receiver) by optimizing the loop bandwidth.

The digital PLL receiver 52 in FIG. 13 consists of three main components. The phase detector 54 provides an error signal that is proportional to the phase difference between the received signal and the output of the voltage controlled oscillator 56 (VCO). This error signal is then input into the loop filter 58 which provides a control signal to the VCO 56 to eliminate the error. The output of the phase detector 54 is given as $$\sin\phi_r \sin\left(\hat{\phi}+\frac{\pi}{2}\right) + \cos\phi_r \cos\left(\hat{\phi}+\frac{\pi}{2}\right) = \cos\left(\phi_r - \hat{\phi} - \frac{\pi}{2}\right) \quad (19)$$
$$= \sin(\phi_r - \hat{\phi}).$$

The loop filter 58 is chosen as the perfect integral filter given as $$F(s) = 1 + \frac{G}{s} \xrightarrow{z\,transform} 1 + \frac{G}{1-z^{-1}} = F(z). \quad (20)$$

The closed loop transfer function of the PLL receiver 52 is then given as $$H(s) = \frac{KF(s)}{s + KF(s)} \quad (21)$$
$$= \frac{Ks + KG}{s^2 + Ks + KG}$$
$$= \frac{2\zeta\omega_n s + \omega_n^2}{s^2 + 2\zeta\omega_n s + \omega_n^2},$$

where $\omega_n$ is the natural frequency of the closed loop and is the damping factor. G, the gain constant of the loop filter, and K, the loop gain, are then determined from $\omega_n$ and $\zeta$ as $G=\omega_n/2\zeta$ and $K=2\zeta\omega_n$.

Figure 14:
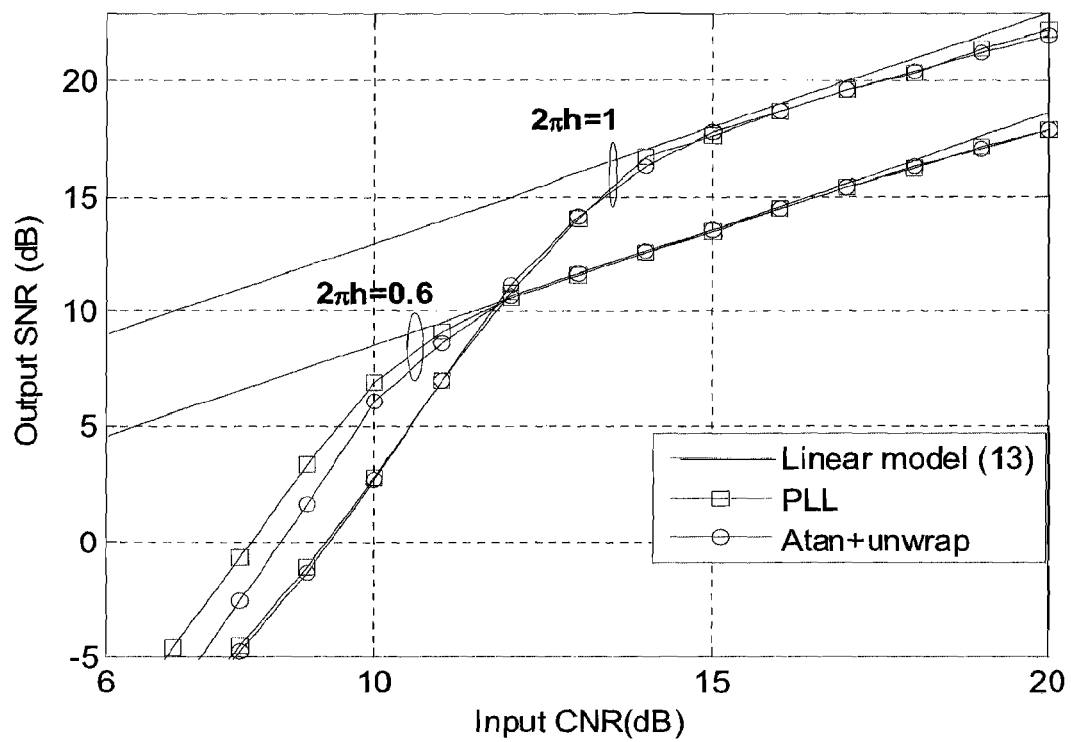
FIG. 14 is a graph of the demodulated SNR as a function of CNR with $R_{OS}=10$ for several different types of phase demodulators.

FIG. 14 shows the demodulated SNR plotted against the CNR for both the PLL receiver 52 and the arctangent based receiver 50 with a phase unwrapper for modulation indices of $2\pi h=0.6$ and 1. The simulation was conducted with an over sampling factor of $R_{OS}=10$ and 12 for modulation indices of $2\pi h=0.6$ and 1 respectively. The predetection filter 42 was employed with $fT_b=0.35$ and 1 for the PLL receiver 52 and $fT_b=0.7$ and 1.4 for the arctangent receiver 50 for modulation indices of $2\pi h=0.6$ and 1 respectively. The natural frequency of the closed loop was selected as $f_n=\omega_n/2\pi=1.25/T_b$ after optimization while the damping factor of $\zeta=0.707$ was selected. The results shown in FIG. 14 indicate a slight reduction in threshold for $2\pi h=0.6$ compared to the arctangent receiver 50 with phase unwrapper ($R_{OS}=4$) shown earlier in FIGS. 11 and 12 while the reduction is around 1.5 dB compared to the CCR 44.

While the PLL receiver 52 does provide threshold extension over the limiter discriminator type receiver (CCR 44 shown in FIGS. 11 and 12), the threshold extension is relatively small. This is due to the relatively low modulation indices being considered here. Further reducing the PLL receiver 52 loop bandwidth to obtain a larger threshold extension results in signal distortion of the embedded OFDM signal. The arctangent receiver 50 also performs quite well compared to the PLL receiver 52.

Another threshold extension technique that may be employed in FM is based on click noise elimination. The elimination of click noise reduces the effective output noise power thus improving the demodulated SNR. The basic idea is to accurately detect clicks while avoiding detection of any false clicks. This is followed by compensating for the clicks with the goal of canceling them out completely.

Figure 15:
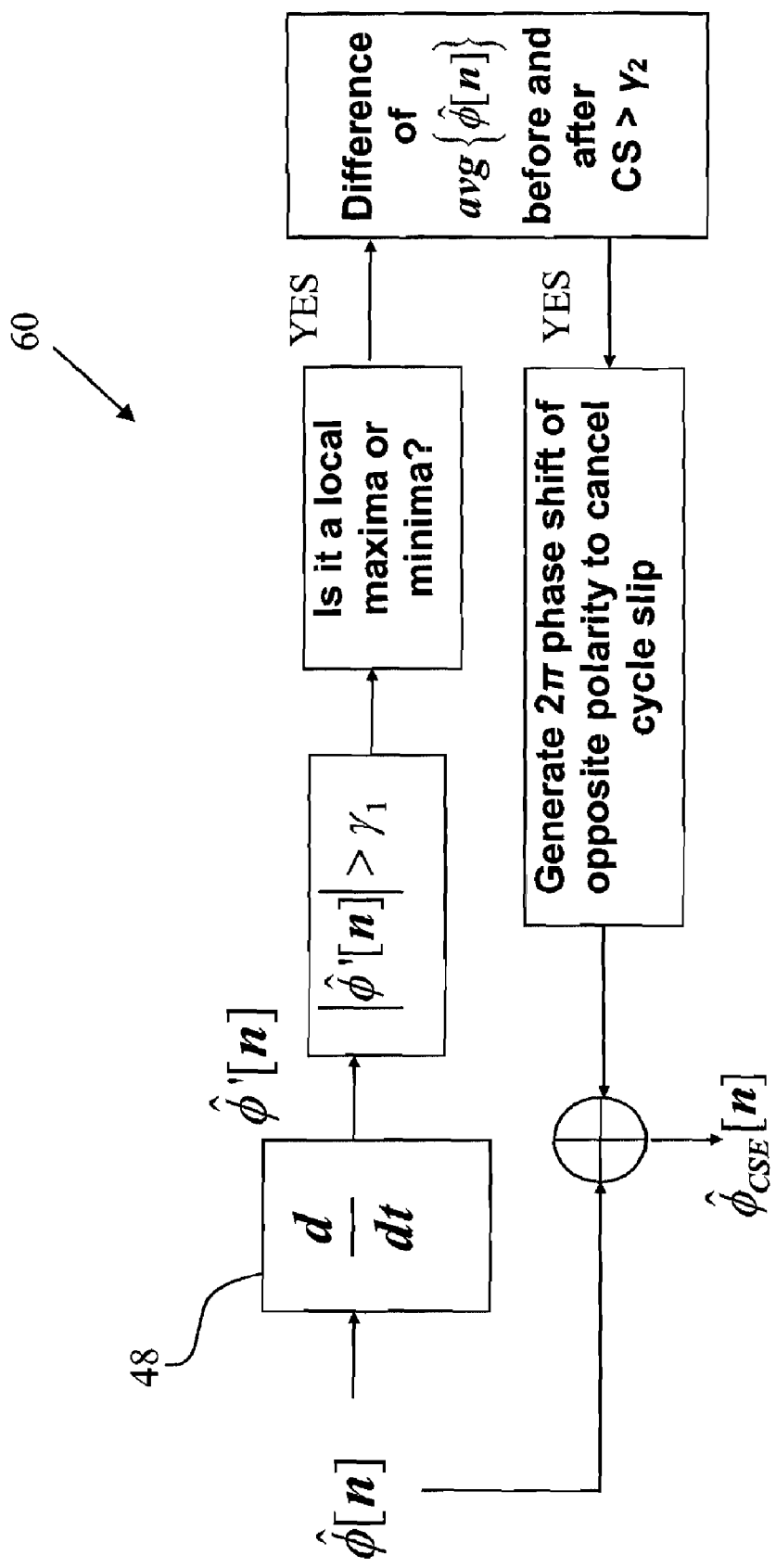
FIG. 15 shows a cycle slip eliminator.

FIG. 15 shows a cycle slip eliminator 60. In the cycle slip eliminator 60, the demodulated phase is differentiated using a differentiator 48 to reveal large phase jumps due to cycle slips. The differentiated phase signal is then compared to a first threshold value ($\gamma_1$) to pinpoint potential cycle slips which are also required to be local maxima or minima. The potential cycle slips that exceed the first threshold are then verified by requiring the difference between the average value of the phase before and after the potential cycle slip to be greater than a second threshold value $\gamma_2$. This average is computed over 25 samples or less if there is another potential cycle slip within 25 samples. Each cycle slip that is detected with this technique is then cancelled by adding a $2\pi$ phase shift of polarity opposite to the cycle slip.

Figure 16:
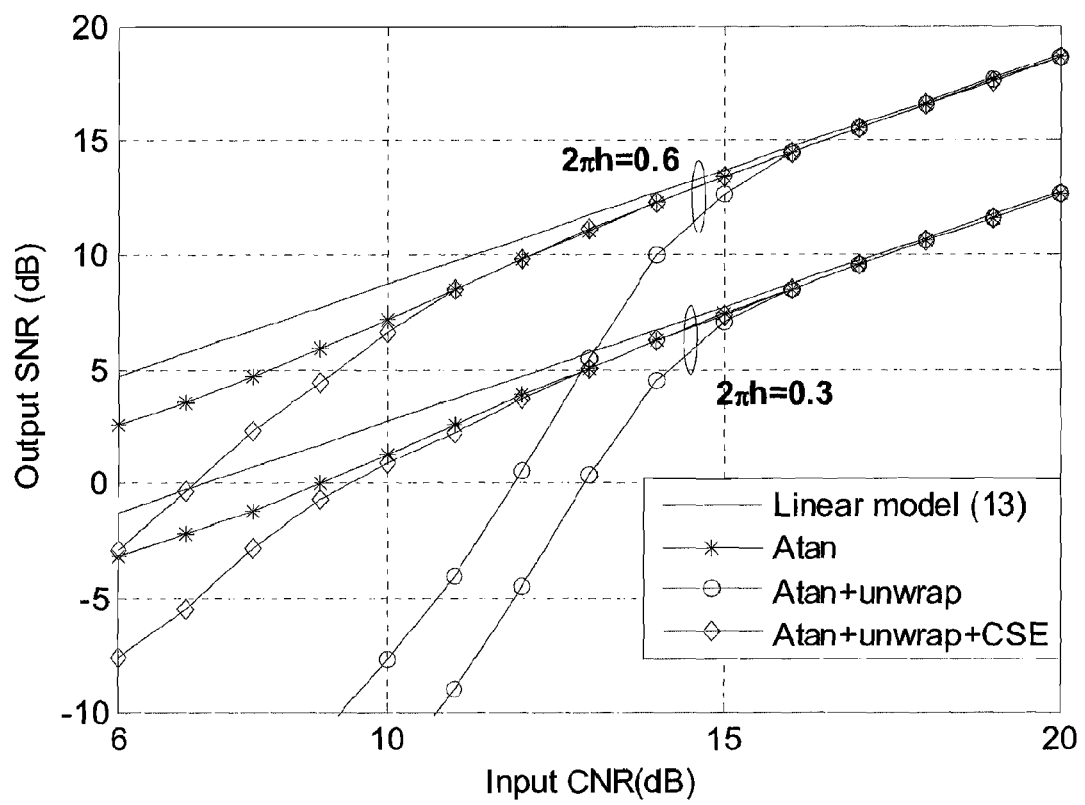
FIG. 16 shows the performance of the cycle slip eliminator without a predetection filter.
Figure 17:
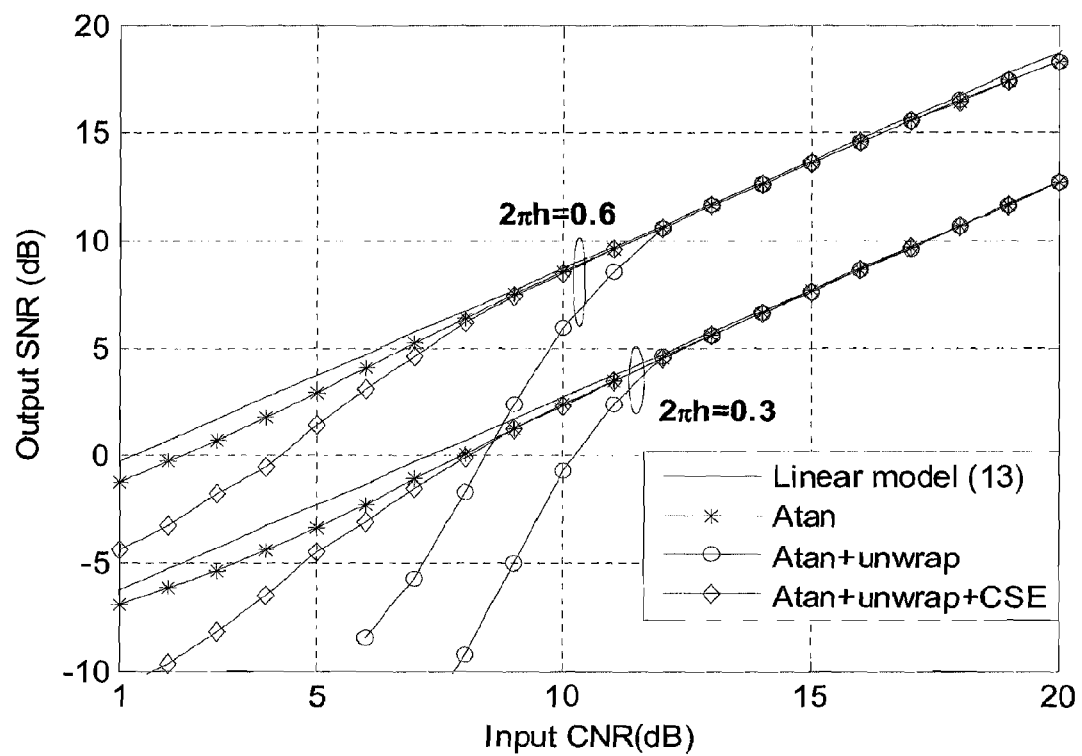
FIG. 17 shows the performance of the cycle slip eliminator with a predetection filter.

FIGS. 16 and 17 show the performance of the cycle slip eliminator 60 for CE-OFDM modulation indices of $2\pi h=0.3$ and 0.6 for an over sampling factor of $R_{OS}=4$. FIG. 16 is for the case without a predetection filter 42 with $\gamma_1=1.5$, $\gamma_2=5\pi/4$ for $2\pi h=0.3$ and $\gamma_1=2$, $\gamma_2=5\pi/4$ for $2\pi h=0.6$. FIG. 17 shows the case using a predetection filter 42 ($fT_b=2.4$ for $2\pi h=0.3$ and $fT_b=1.6$ for $2\pi h=0.6$) and where $\gamma_1=1.5$, $\gamma_2=5\pi/4$ for $2\pi h=0.3$ and $\gamma_1=0.75$, $\gamma_2=5\pi/4$ for $2\pi h=0.6$. In both cases, the cycle slip eliminator 60 provides considerable threshold extension without requiring a large over sampling factor. Without the predetection filter 42, the cycle slip eliminator 60 provides around 5 dB of threshold extension while for the case with the predetection filter 42, threshold extension is more than 5 dB.

Figure 18:
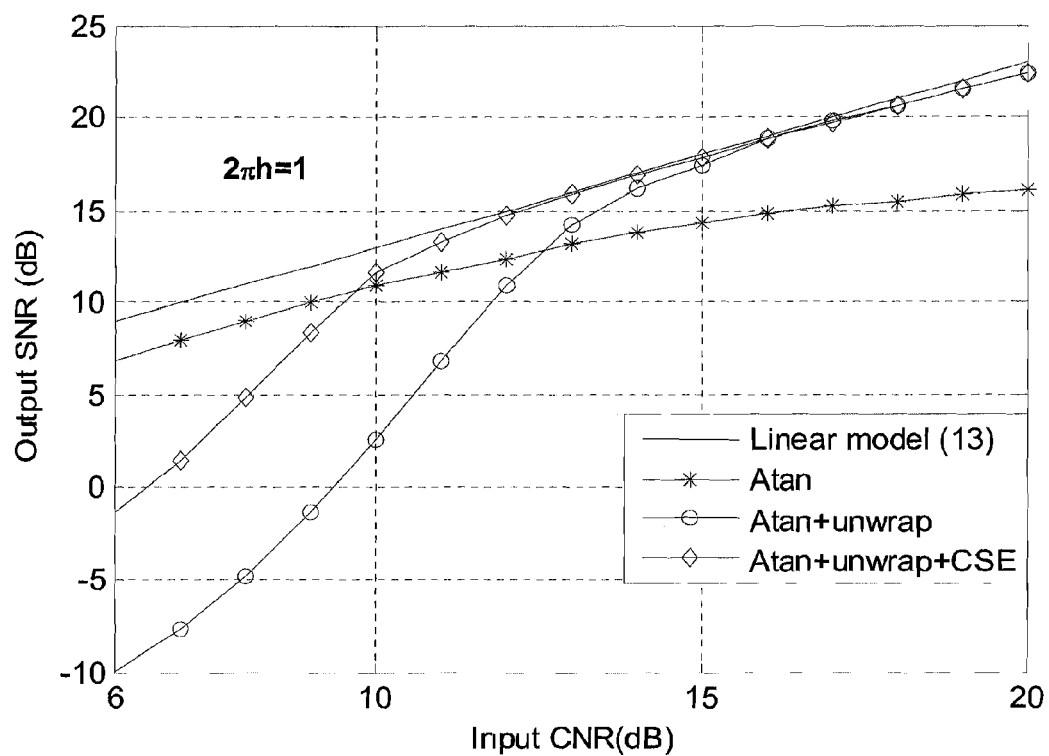
FIG. 18 shows the performance of the cycle slip eliminator 60 for CE-OFDM with a modulation index of $2\pi h=1$ for an over sampling factor of $R_{OS}=8$.

FIG. 18 shows the performance of the cycle slip eliminator 60 for CE-OFDM with a modulation index of $2\pi h=1$ for an over sampling factor of $R_{OS}=8$. As shown in FIG. 18, the cycle slip eliminator 60 achieves a threshold extension of 4 dB down to a CNR of 10 dB. FIG. 18 also shows the performance loss for the arctangent receiver 50 without a phase unwrapper. This is due to the phase wrapping which is much more frequent for higher modulation indices whereby the CE-OFDM phase traverses a larger section of the unit circle as shown earlier in FIG. 10. FIG. 18 is for the case with a prediction filter 42 ($fT_b=3$) for $2\pi h=1$ and $\gamma_1=1.5$, $\gamma_2=5\pi/4$.

From the above description of the Angle-Modulated Signal Threshold Extension Device and Method, it is manifest that various techniques may be used for implementing the concepts of method 10 without departing from its scope. The described embodiments are to be considered in all respects as illustrative and not restrictive. It should also be understood that method 10 is not limited to the particular embodiments described herein, but is capable of many embodiments without departing from the scope of the claims.

I claim:

1. A threshold noise-canceling method comprising the steps of:
    a) receiving an angle-modulated signal;
    b) identifying in the angle-modulated signal potential threshold noise events that exceed a first threshold value;
    c) calculating with a processor average values of the phase of the angle-modulated signal before and after a potential threshold noise event;

d) identifying every potential threshold noise event as a threshold noise event when the difference between the corresponding before and after average values of the phase is greater than a second threshold value; and e) canceling out each threshold noise event by adding to the phase of the angle-modulated signal a $2\pi$ phase shift of polarity opposite to that of the corresponding threshold noise event.

2. The method of claim 1, wherein the angle-modulated signal is a phase modulated signal and the threshold noise events are cycle slips, and further comprising the following steps:

demodulating the phase of the angle-modulated signal between steps (a) and (b); and differentiating the phase of the angle-modulated signal between steps (a) and (b) to obtain a differentiated phase signal.

3. The method of claim 2, wherein the angle-modulated signal is a constant envelope orthogonal frequency division multiplexing (CE-OFDM) signal.

4. The method of claim 3, wherein the average values are computed over 25 samples or less if there is another potential cycle slip within 25 samples.

5. The method of claim 4, wherein the demodulating step is performed by an arctangent-based demodulator.

6. The method of claim 5, further comprising unwrapping the demodulated phase before differentiating.

7. The method of claim 4, wherein the demodulating step is performed by a limiter discriminator type demodulator.

8. The method of claim 4, wherein the demodulating step is performed by a phase-locked loop.

9. The method of claim 4, wherein the demodulating step is performed by a cross-correlator receiver.

10. The method of claim 4, further comprising the step of rejecting out-of-band noise with a predetection filter before the demodulating step.

11. The method of claim 1, wherein the angle-modulated signal is a frequency modulated signal and the threshold noise events are clicks, and further comprising the steps of:

demodulating the frequency of the angle-modulated signal and differentiating the phase of the angle-modulated signal between steps (a) and (b); and integrating the frequency of the angle-modulated signal between steps (b) and (c) to obtain a phase signal.

12. The method of claim 11, further comprising the step of rejecting out-of-band noise with a predetection filter before the demodulation step.

13. The method of claim 12, wherein the average values are computed over 25 samples or less if there is another potential threshold noise event within 25 samples.

14. A constant envelope orthogonal frequency division multiplexing (CE-OFDM) receiver comprising:

a phase demodulator configured to demodulate the phase of a CE-OFDM signal;

a cycle-slip eliminator comprising:

a differentiator configured to differentiate the demodulated phase to produce a differentiated phase signal, a comparator configured to identify potential cycle slips in the differentiated phase signal that exceed a first threshold value, a processor configured to calculate average phase values of the phase signal before and after each potential cycle slip, wherein the processor is further configured to identify every potential cycle slip as a cycle slip when the difference between the before and after average phase values is greater than a second threshold value, and a phase shifter configured to add to the phase signal a $2\pi$ phase shift of polarity opposite to that of the corresponding cycle slip thereby producing a noise-reduced OFDM signal; and an OFDM demodulator configured to demodulate the noise-reduced OFDM signal.

15. The CE-OFDM receiver of claim 14, wherein the average phase values are computed over 25 samples or less if there is another potential cycle slip within 25 samples.

16. The CE-OFDM receiver of claim 15, wherein the phase demodulator is an arctangent-based demodulator.

17. The CE-OFDM receiver of claim 16, wherein the phase demodulator further comprises a phase unwrapper.

18. The CE-OFDM receiver of claim 17, further comprising a predetection filter configured to reject out-of-band noise in the CE-OFDM signal before it reaches the demodulator.

* * * * *